Dec. 26, 1922.
J. S. DE MIRANDA.
ARTICULATED CHASSIS FOR AUTOMOBILES.
FILED AUG. 26, 1921.
1,439,802.
2 SHEETS—SHEET 1.
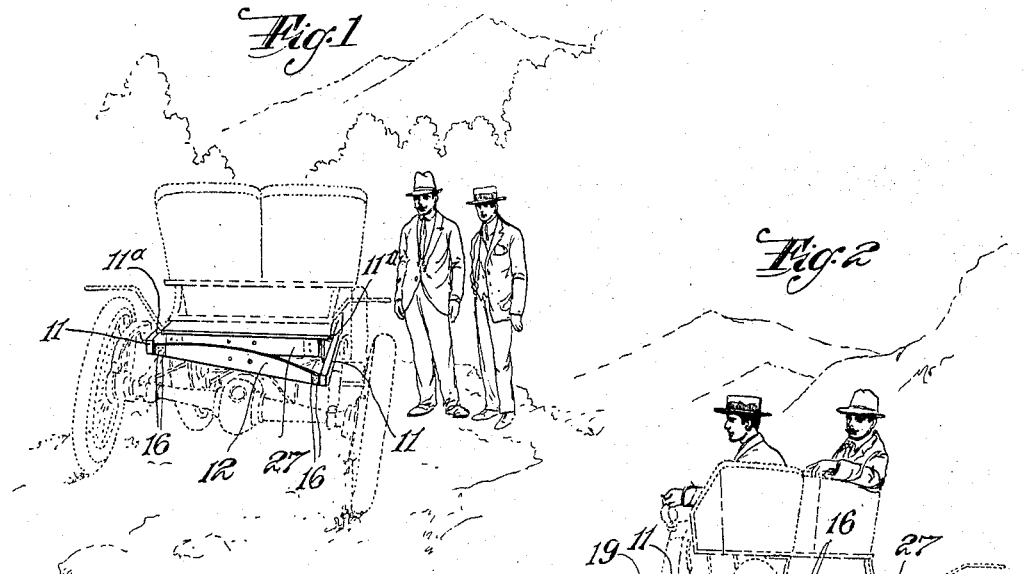
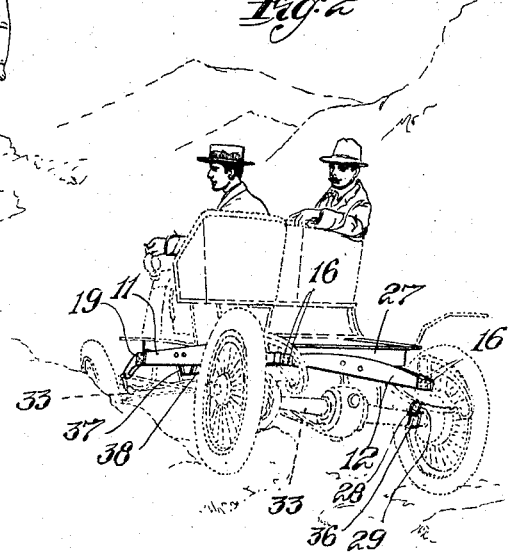
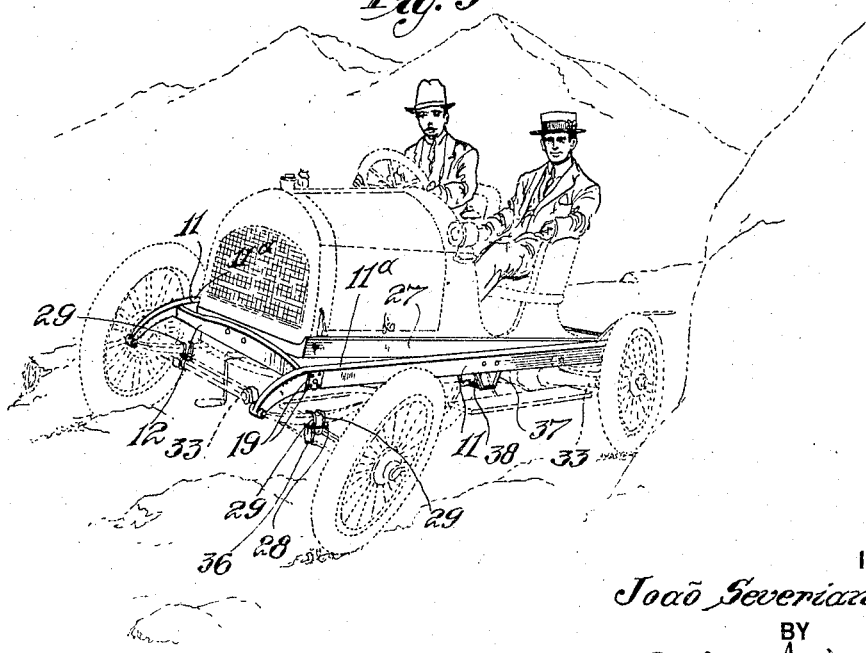
INVENTOR
João Severiano de Miranda
BY
Arthur Middleton
ATTORNEY Dec. 26, 1922. 1,439,802.
J. S. DE MIRANDA.
ARTICULATED CHASSIS FOR AUTOMOBILES.
FILED AUG. 26, 1921. 2 SHEETS—SHEET 2.
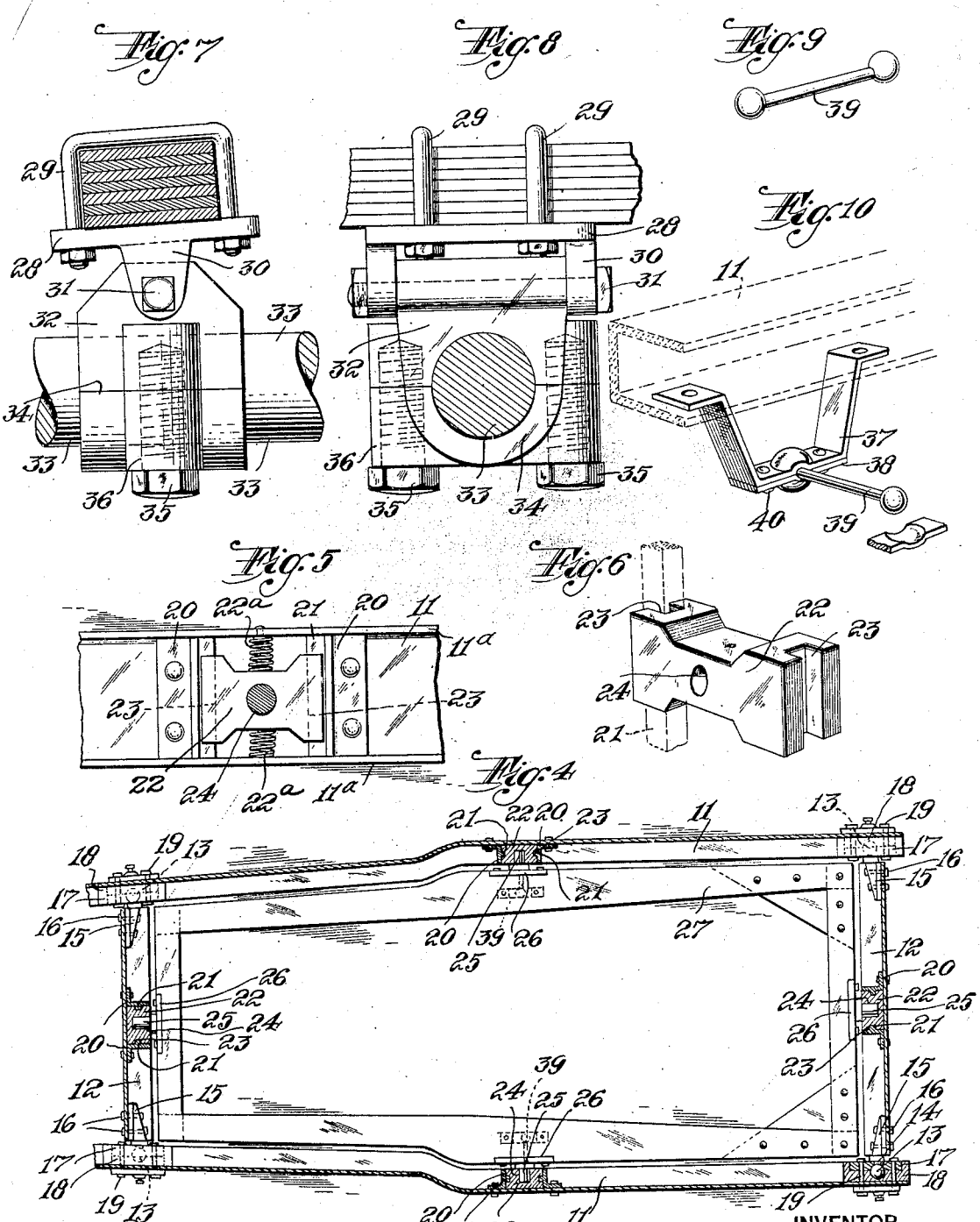
INVENTOR
João Severiano de Miranda
BY
ATTORNEY Patented Dec. 26, 1922.

1,439,802

UNITED STATES PATENT OFFICE.

JOAO SEVERIANO DE MIRANDA, OF TAUBATE, BRAZIL.

ARTICULATED CHASSIS FOR AUTOMOBILES.

Application filed August 26, 1921. Serial No. 495,475.

*To all whom it may concern:*

Be it known that I, JOAO SEVERIANO DE MIRANDA, a citizen of Brazil, residing at Taubate, Brazil, have invented certain new and useful Improvements in Articulated Chassis for Automobiles, of which the following is a specification.

This invention relates to chassis for vehicles, and more particularly for automobiles. Although the invention is applicable to any vehicle having more than two points of contact with the ground or other supporting member.

The object of this invention is to prevent damage to chassis of such a vehicle, due to torsional strains, which normally develop when the points of support of said vehicle pass over uneven ground, or obstructions on the track, roadway, or the like.

Another object is to so construct the chassis of a vehicle, that it will in itself absorb a material part of any shock encountered, aside from that taken up by the springs, with which it is normally equipped. Thus reducing the shock delivered to the motive power, occupant or load to a minimum.

These and other objects, I secure by forming a vehicle chassis, with an outer and an inner frame, which in the embodiment illustrated is of a substantially rectangular configuration. The outer and inner frames are pivotally connected at points substantially midway of each side. The individual members making up the outer frame, are joined at their ends, by ball and socket joints. The pivot joints between frames, is such as will allow a slight vertical movement as well as a rotative one.

The invention further consists in the novel arrangement, construction and combination of parts more fully hereinafter described.

The preferred form of my invention, is illustrated in the accompanying drawings, in which, Figs. 1, 2, 3 show an automobile equipped with my device in various positions. Fig. 4 is a plan view of the double frame chassis. Figs. 5 and 6 details of the pivot joint. Figs. 7 and 8 details of the pivot shackle attached to the springs, and Figs. 9 and 10 details of an auxiliary ball and socket joint reinforcing the connection between the outer and inner frames.

In carrying out my invention, I provide an outer or usual chassis frame, consisting of longitudinal members 11, having flanges 11ª, and lateral member 12, joined by means of ball and socket joint. Such a joint is shown to comprise a ball portion 13, having a neck section 14, and a wedge-shaped part or web 15, said last named part being supplied with apertures, through which bolt 16, may be passed to secure the ball member to the part 12. The socket member may comprise two complementary parts 17 and 18 having a substantially spherical recess included between themselves. Bolts 19 are adopted to secure parts 17 and 18 together, and both to the frame part 11.

The pivot joint between the frames, comprises L members or brackets 20, secured to the outer frame member 11, each having a projecting rib 21. A slide bar or block 22 having slots 23 at each end thereof adapted to engage and hold therein the ribs 21, is provided and is designed to have spring members 22ª, secured between itself and the flanges 11ª of the frame.

A central recess 24, is provided in member 22 to receive the pivot pin 25 integral with base plate 26, secured to the inner frame 27. The inner frame is of a substantially flexible construction, without positive movable joints as in the case of the outer frame.

This construction necessitates the front leaf springs to be pivoted on an axis transverse to the front axle, as with the amount of movement allowable with this arrangement of parts would tend to unduly twist the same. A satisfactory combination consists of a member 28 bolted to the spring shackles 29 and having apertured lugs 30 adapted to receive pivot bolt 31 and member 32 between themselves. Member 32 is recessed on its lower face to conform to the upper half of the front axle 33, and the complementary member 34 likewise embraces the lower half of the axle, the two being secured together as by bolts 35 received in screw threaded recesses in rib extensions 36.

An additional stay is provided between the outer and inner frames consisting of an extension bracket 37, secured to the under side of the outer frame and having a plate 38, both bracket and plate being adapted to receive and hold the ball like end of dumbbell shaped member 39, by such means as bolts or rivets 40. The other end of member 39 is secured to a like bracket on the other side of the inner frame, the entire additional joint being positioned in proximity to but below the side pivots that is on the long side of the chassis.

It will now be seen that in the case shown in Fig. 3, where a front wheel meets an obstruction and rides up on it, the inner frame forming the engine bed will be allowed a certain movement about its fore and aft axis, while all torsional strains are taken up by the ball and socket joints of the outer frame. At the same time, the front springs are permitted a slight swinging movement about pin 31 as an axis, thus allowing the entire structure to adjust itself to the inequalities of the roadway without strain.

The spring members above and below the pivot blocks on the long side of the chassis, tend to take up a material part of the shock resulting from a rough road-way all of which descreases strains passing to the power plant and body.

Various modifications will occur to those skilled in this art, which will still fall in spirit of my invention. As this specification and drawing is merely illustrative of various ways of putting my invention into practice.

What I claim is:

1. In combination in a vehicle, an outer frame, an inner frame, pivots between said frames, and shock absorbing means on said pivots having a sliding block.

2. The device in claim 1, in which said means include a spring pressed sliding block.

3. The device of claim 1, in which said means include a rib-guided sliding block.

4. In combination in a vehicle, an outer frame, an inner frame, springs between said frames, shock absorbers for said pivots, including a sliding block and means for preventing twisting of said blocks.

5. In combination in a vehicle, a main frame channeled in cross section, an inner frame, pivots between the frames, bracket means lying within said channeled frame, and shock absorbers for said pivots operable in connection with said bracket means.

6. The device in claim 5, in which the shock absorbers slidably engage the bracket means.

7. The device of claim 1, with stay means for limiting lateral movement between the frames comprising brackets and a stay connecting the brackets.

In testimony whereof I have affixed my signature to this specification.

JOAO SEVERIANO de MIRANDA.